(12) United States Patent
Yoshida

(10) Patent No.: US 9,854,118 B2
(45) Date of Patent: Dec. 26, 2017

(54) IMAGE READING APPARATUS

(71) Applicant: CANON COMPONENTS, INC., Saitama (JP)

(72) Inventor: Hidemasa Yoshida, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/224,855

(22) Filed: Aug. 1, 2016

(65) Prior Publication Data

US 2017/0064124 A1 Mar. 2, 2017

(30) Foreign Application Priority Data

Aug. 27, 2015 (JP) ................................. 2015-168270

(51) Int. Cl.
*H04N 1/04* (2006.01)
*H04N 1/028* (2006.01)
*H04N 1/03* (2006.01)
*H04N 1/00* (2006.01)

(52) U.S. Cl.
CPC .......... *H04N 1/0286* (2013.01); *H04N 1/0057* (2013.01); *H04N 1/02855* (2013.01); *H04N 1/03* (2013.01); *H04N 2201/0094* (2013.01)

(58) Field of Classification Search
CPC .... H04N 1/0289; H04N 1/02815; H04N 1/04; H04N 2201/0081; H04N 2201/02435; H04N 2201/02462; F21S 48/1159; F21S 48/1225; F21S 48/1731; F21V 13/02; F21V 13/12; G06K 9/0004; G06K 9/00046

USPC .............. 358/475, 474, 442, 482, 487, 509; 362/607, 612, 616, 235, 610; 399/168, 399/220

See application file for complete search history.

(56) References Cited

U.S. PATENT DOCUMENTS

| 9,001,394 B2* | 4/2015 | Joh ..................... H04N 1/02835 358/474 |
| 2010/0177362 A1* | 7/2010 | Kim .................... H04N 1/02815 358/474 |
| 2012/0162727 A1* | 6/2012 | Shimoda ............ H04N 1/02481 358/475 |
| 2013/0038913 A1 | 2/2013 | Shimoda et al. |
| 2014/0063568 A1* | 3/2014 | Wilsher .................. F21V 13/02 358/475 |

(Continued)

FOREIGN PATENT DOCUMENTS

JP 2013055646 A 3/2013

*Primary Examiner* — Negussie Worku
(74) *Attorney, Agent, or Firm* — Rossi, Kimms & McDowell LLP

(57) ABSTRACT

A transmission light source unit includes a first light source portion including: a first light source; and a first light guide that shapes light emitted by the first light source into a line and emits the light toward a conveyance path of a paper sheet. An image sensor unit includes: a second light source portion that emits light toward the conveyance path of the paper sheet; and an image sensor that detects the light emitted by the first light source portion and transmitted through the paper sheet and the light emitted by the second light source portion and reflected by the paper sheet. A first light diffusing surface of the first light guide is provided with at least one of concave portions and convex portions including inclined surfaces and inclined relative to a normal line of the first light emission surface.

5 Claims, 11 Drawing Sheets

(56) References Cited

U.S. PATENT DOCUMENTS

| | | | | |
|---|---|---|---|---|
| 2014/0139893 A1* | 5/2014 | Sugiyama | .......... | H04N 1/02835 358/475 |
| 2014/0355078 A1* | 12/2014 | Fujiuchi | ............. | H04N 1/02825 358/474 |
| 2015/0060651 A1* | 3/2015 | Yoshida | ............. | H04N 1/02855 250/216 |
| 2016/0006898 A1* | 1/2016 | Tsumekawa | ....... | H04N 1/02835 358/484 |
| 2017/0064125 A1* | 3/2017 | Tsumekawa | ......... | H04N 1/0286 |

* cited by examiner

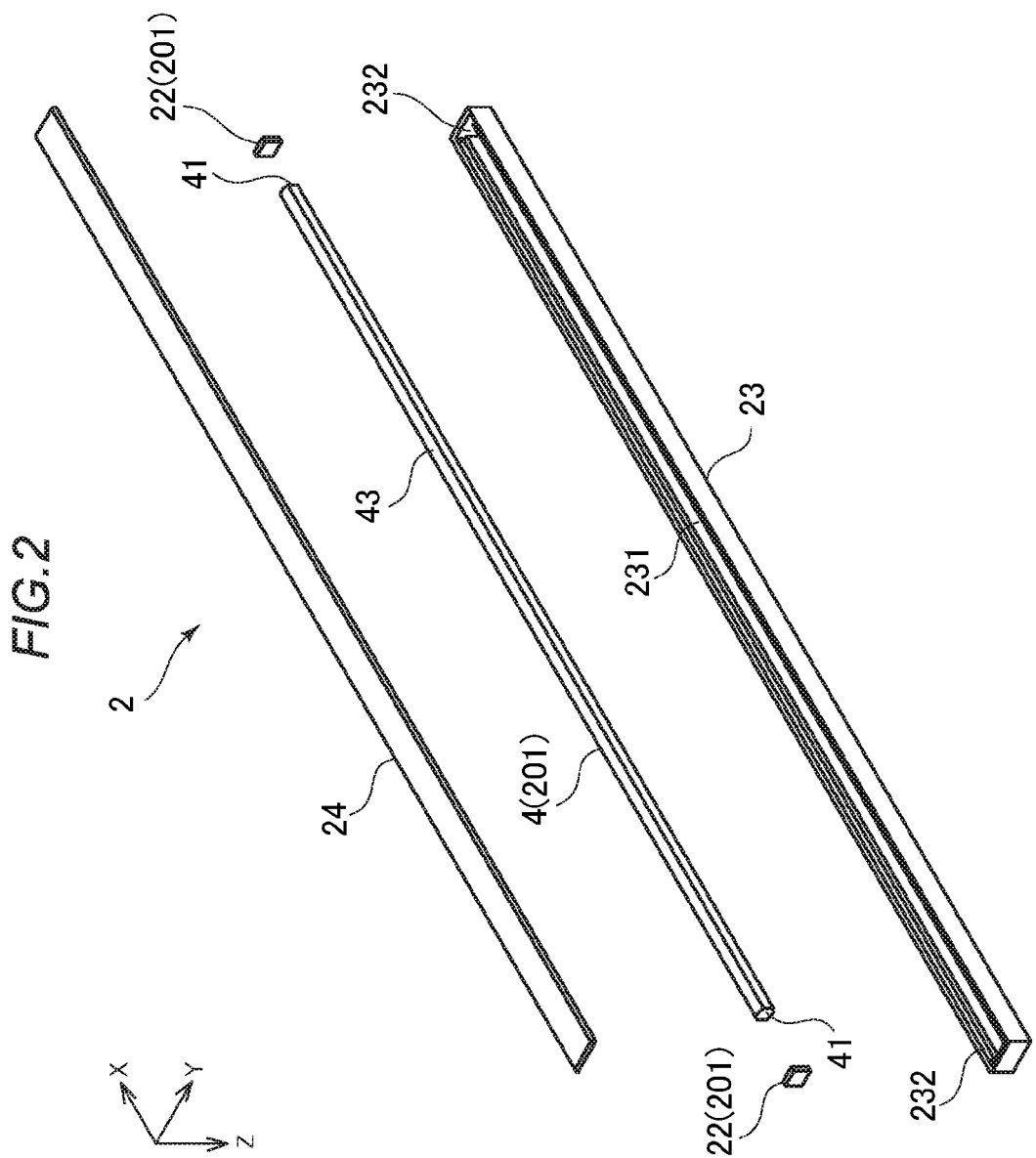

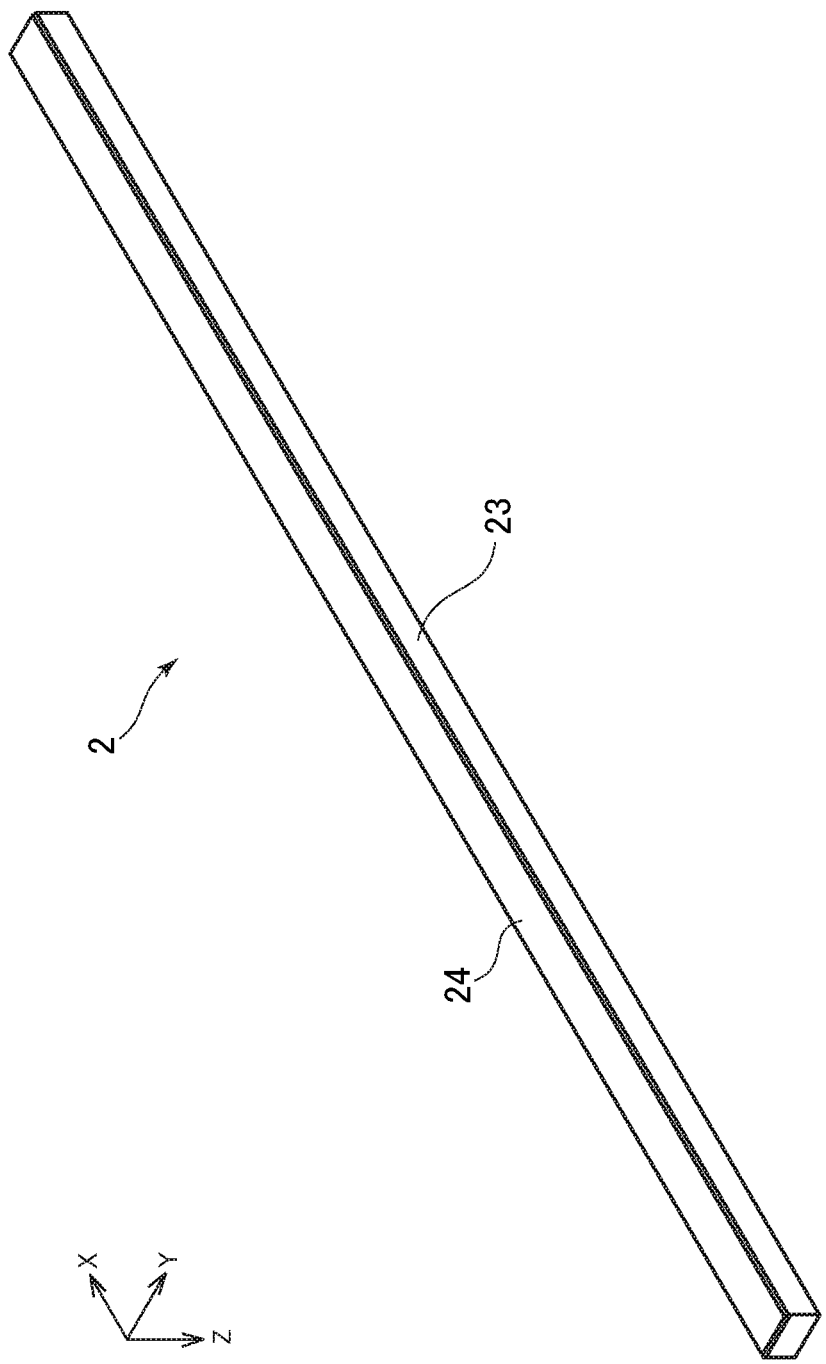

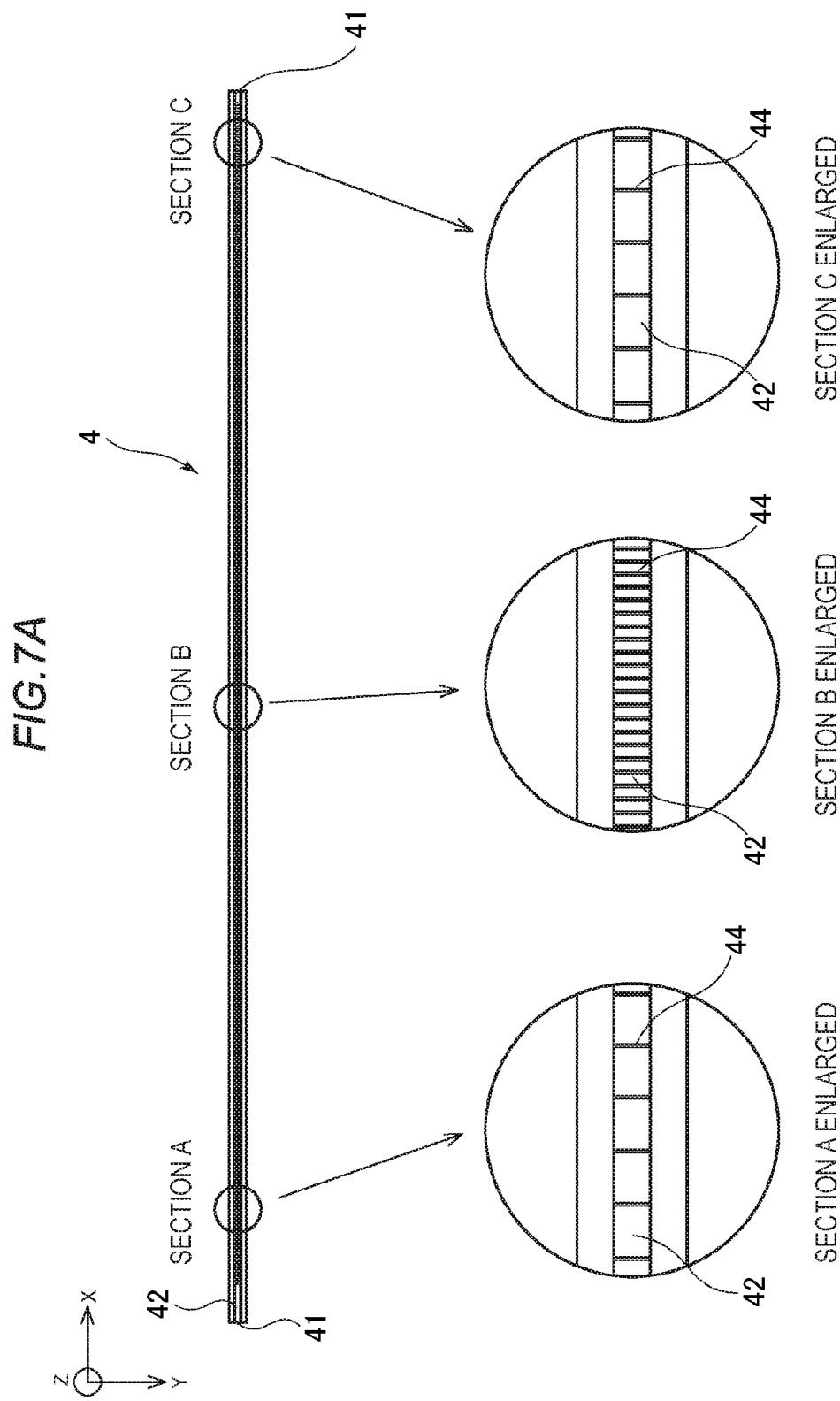

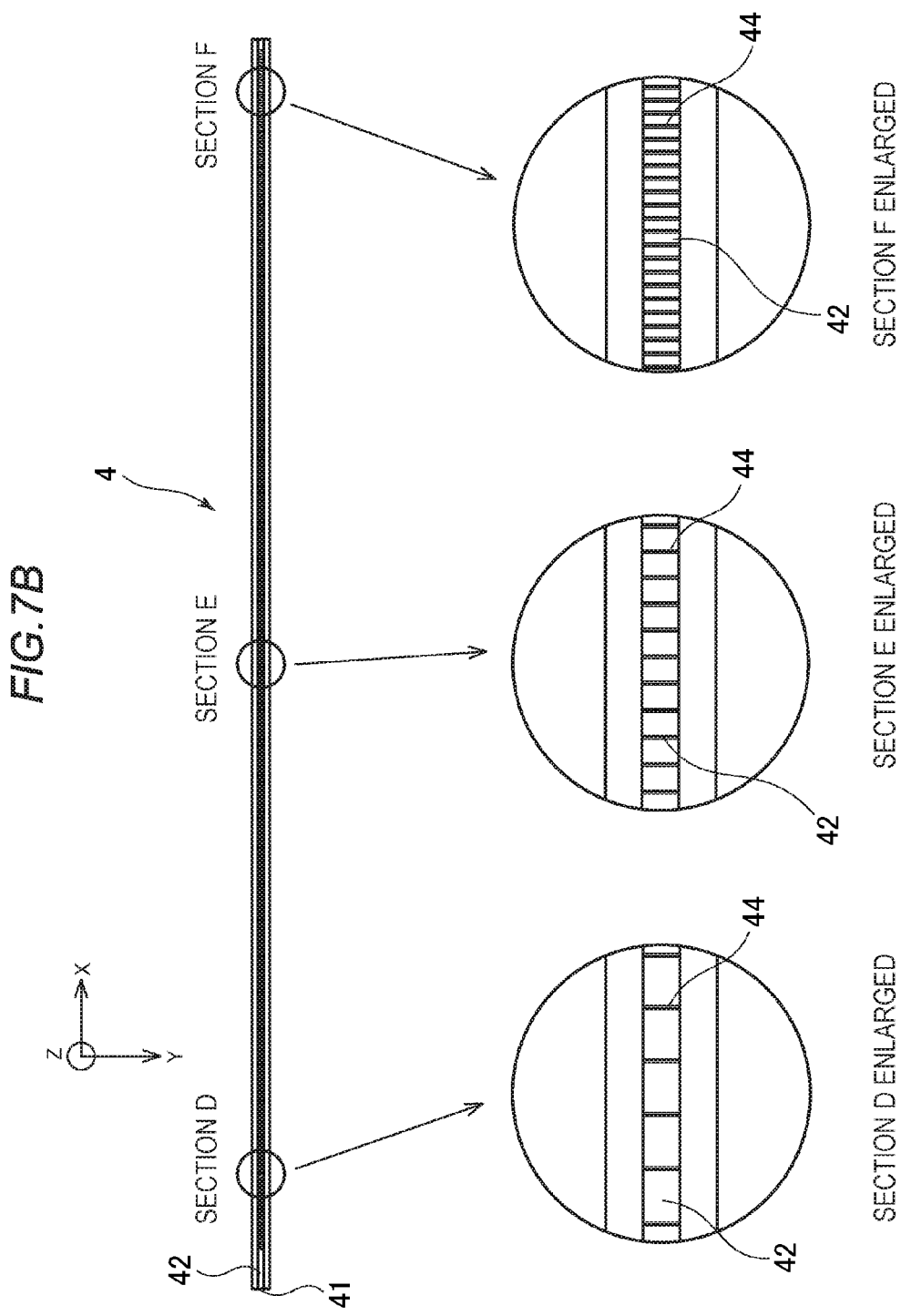

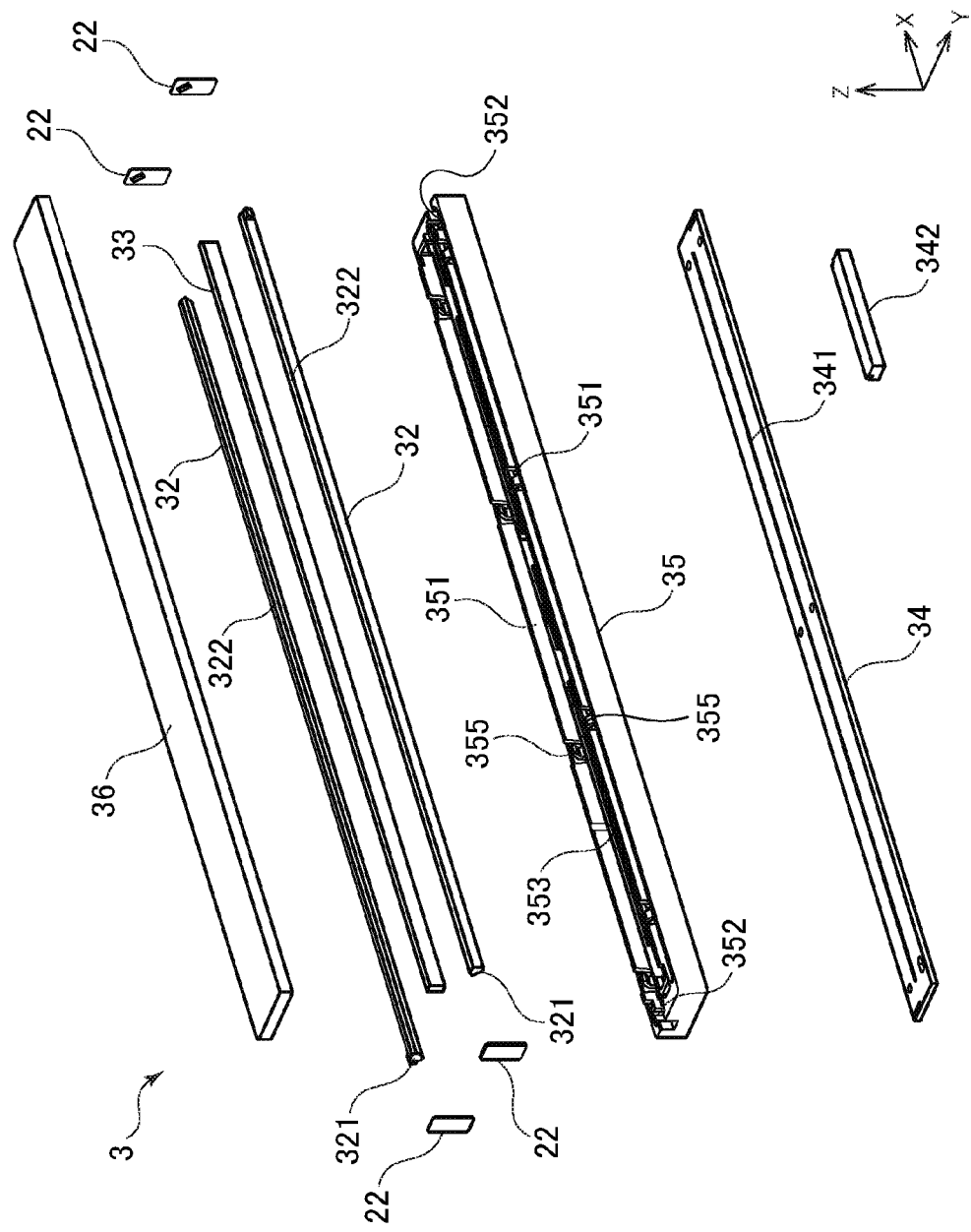

IMAGE READING APPARATUS

CROSS REFERENCE TO RELATED APPLICATIONS

This application is based upon and claims the benefit of priority of the prior Japanese Patent Application No. 2015-168270, filed on Aug. 27, 2015, the entire contents of which are incorporated herein by reference.

BACKGROUND OF THE INVENTION

Field of the Invention

The present invention relates to an image reading apparatus, and particularly, to an image reading apparatus including a transmission light source unit for transmission reading of a paper sheet.

Description of the Related Art

Conventionally, an image reading apparatus that reads a paper sheet, such as a bill, includes an image sensor unit that detects light from the paper sheet and converts the light to an electric signal. The image sensor unit applied in the image reading apparatus includes, for example: a linear light source that emits linear light to a paper sheet; and an image sensor that detects reflected light from the paper sheet and converts the reflected light to an electric signal. The image sensor unit emits light to the paper sheet through the linear light source and detects reflected light through the image sensor to perform reflection reading of the paper sheet.

Some image reading apparatus capable of transmission reading of paper sheets include transmission light source units as light source apparatuses for transmission reading. The transmission light source unit includes, for example: a point light source such as an LED; and a rod-like light guide that shapes light emitted by the point light source into a line (shapes a point light source into a line light source). The transmission light source unit is arranged to face the image sensor unit across a conveyance path of the paper sheet. The image sensor of the image sensor unit detects the light emitted by the transmission light source unit and transmitted through the paper sheet and converts the detected light to an electric signal. In this way, the image sensor unit uses the light emitted by the transmission light source unit to perform the transmission reading of the paper sheet.

In the reflection reading, it is preferable that a contrast between the paper sheet and outside around the paper sheet (hereinafter, called background) is high in order to improve accuracy of distinguishing a range (contour of outer shape) of the paper sheet. Particularly, to read a paper sheet with a high brightness, it is preferable that the brightness of the background is lower than that of the paper sheet, and it is more preferable that the brightness is in a black level. However, when the transmission light source unit is arranged to face the image sensor unit, the light emitted by the linear light source of the image sensor unit may enter the light guide of the transmission light source unit, and the light entering the light guide may be emitted toward the image sensor unit. The light will be called re-illumination light. When the re-illumination light enters the image sensor unit, the brightness of a section without the paper sheet (i.e. background) is high in an image output by the image sensor, and the contrast between the paper sheet and the background of the image is reduced.

Patent Document 1

Japanese Laid-open Patent Publication No. 2013-55646

An example of a configuration for preventing the reduction in the contrast between the paper sheet and the background is disclosed in Patent Document 1, wherein a polarizing filter and a light blocking sheet are arranged between the linear light source of the image sensor unit and the light guide of the transmission light source unit. However, the polarizing filter and the light blocking sheet are necessary according to the configuration. Therefore, the number of components is increased, and the configuration is complicated.

SUMMARY OF THE INVENTION

In view of the circumstances, an object of the present invention is to provide an image reading apparatus that can reduce re-illumination light to improve a contrast between a paper sheet and a background without increasing the number of components or complicating the configuration.

To solve the problem, the present invention provides an image reading apparatus including a transmission light source unit and an image sensor unit arranged to face each other across a conveyance path of a paper sheet, the transmission light source unit including a first light source portion including: a first light source; and a first light guide that shapes light emitted by the first light source into a line and emits the light toward the conveyance path of the paper sheet, the image sensor unit including: a second light source portion that emits light toward the conveyance path of the paper sheet; and an image sensor that detects the light emitted by the first light source portion and transmitted through the paper sheet and the light emitted by the second light source portion and reflected by the paper sheet, the first light guide including: a first light emission surface that emits light toward the conveyance path of the paper sheet; and a first light diffusing surface that is provided on an opposite side of the first light emission surface and that diffuses the light emitted by the first light source, wherein the first light diffusing surface is provided with at least one of concave portions and convex portions including inclined surfaces inclined relative to a normal line of the first light emission surface.

BRIEF DESCRIPTION OF THE DRAWINGS

FIG. 2 is an exploded perspective view schematically illustrating a configuration example of a transmission light source unit;

FIG. 3 is an external perspective view schematically illustrating a configuration example of the transmission light source unit;

FIG. 7A is a view schematically illustrating intervals between a plurality of light reflection portions;

FIG. 7B is a view schematically illustrating intervals between a plurality of light reflection portions;

FIG. 8 is an exploded perspective view schematically illustrating a configuration example of an image sensor unit;

DETAILED DESCRIPTION OF THE PREFERRED EMBODIMENTS

Figure 1:
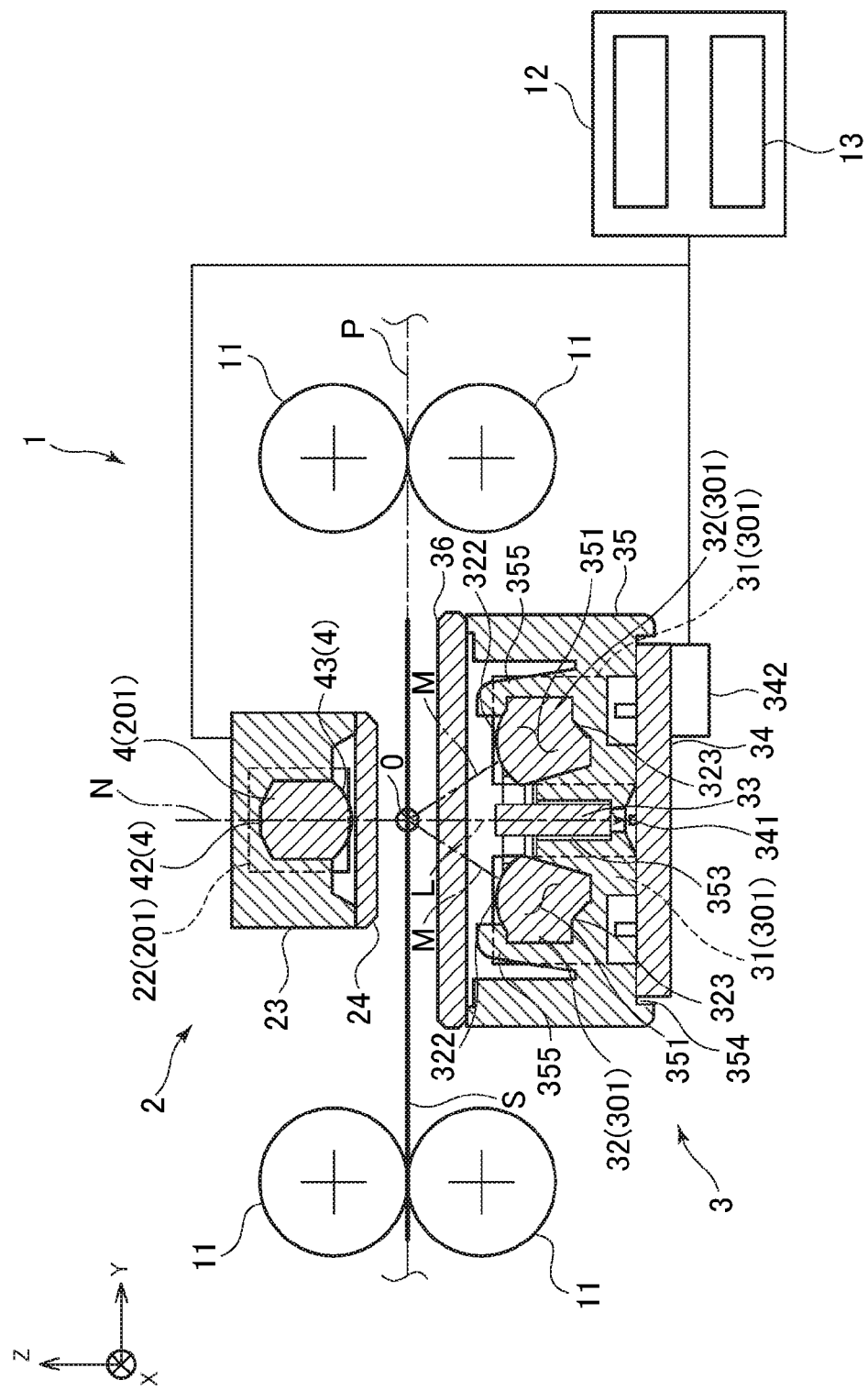
FIG. 1 is a view schematically illustrating a configuration example of essential parts of an image reading apparatus.

An embodiment of the present invention will now be described in detail with reference to the drawings. The embodiment of the present invention illustrates an image reading apparatus including a transmission light source unit and an image sensor unit. In the drawings, three-dimensional directions of the transmission light source unit and the image sensor unit are indicated by arrows X, Y, and Z. An X direction indicates a main-scan direction. A Y direction indicates a sub-scan direction. A Z direction indicates an up-down direction of the image sensor unit. As for the vertical direction, a side provided with the transmission light source unit as viewed from a conveyance path P of a paper sheet S is an upper side, and a side provided with the image sensor unit is a lower side. In the present invention, "light" includes not only visible light, but also electromagnetic waves in wavelength regions other than the visible light (for example, infrared light and ultraviolet light).

<Image Reading Apparatus>

First, a configuration example of essential parts of an image reading apparatus 1 will be described with reference to FIG. 1. FIG. 1 is a view schematically illustrating a configuration example of essential parts of the image reading apparatus 1 and is a view illustrating a cross-sectional structure taken along a surface perpendicular to the main-scan direction. As illustrated in FIG. 1, the image reading apparatus 1 includes a transmission light source unit 2, an image sensor unit 3, conveyor rollers 11, a control portion 12, and an image distinguishing portion 13. The conveyance path P of the paper sheet S to be read is set in the image reading apparatus 1. The transmission light source unit 2 and the image sensor unit 3 are arranged to face each other at a predetermined interval across the conveyance path P of the paper sheet S. Therefore, a gap between the transmission light source unit 2 and the image sensor unit 3 is the conveyance path P of the paper sheet S. The control portion 12 controls a driving force source not shown of the transmission light source unit 2, the image sensor unit 3, and the conveyor rollers 11. The control portion 12 also controls each portion not shown of the image reading apparatus 1. The conveyor rollers 11 are rotated by the driving force source not shown and convey the paper sheet S in the sub-scan direction.

The image reading apparatus 1 may include a drive mechanism that moves the transmission light source unit 2 and the image sensor unit 3 in the sub-scan direction to move the transmission light source unit 2 and the image sensor unit 3 in the sub-scan direction relative to the paper sheet S. In short, it is only necessary that the transmission light source unit 2 and the image sensor unit 3 and the paper sheet S to be read are moved relative to each other in the sub-scan direction.

The transmission light source unit 2 includes first light source portions 201 and emits light from the upper side toward the paper sheet S conveyed through the conveyance path P. The image sensor unit 3 includes second light source portions 301 and emits light from the lower side toward the paper sheet S conveyed through the conveyance path P. The light emitted from the first light source portions 201 of the transmission light source unit 2 to the paper sheet S transmits through the paper sheet S and enters the image sensor unit 3. The light emitted from the second light source portions 301 of the image sensor unit 3 to the paper sheet S is reflected by the paper sheet S and enters the image sensor unit 3. An image sensor 341 provided on the image sensor unit 3 detects the light emitted by the first light source portions 201 and transmitted through the paper sheet S and the light emitted by the second light source portions 301 and reflected by the paper sheet S. The image sensor 341 coverts the light to an image signal that is an electric signal. The image distinguishing portion 13 uses the image signal output by the image sensor 341 to distinguish the paper sheet S conveyed through the conveyance path P. Details of the operation of the image reading apparatus 1 will be described later.

<Transmission Light Source Unit>

Next, a configuration example of the transmission light source unit 2 will be described with reference to FIGS. 2 and 3. FIG. 2 is an exploded perspective view schematically illustrating a configuration example of the transmission light source unit 2. FIG. 3 is an external perspective view schematically illustrating a configuration example of the transmission light source unit 2. As illustrated in FIGS. 2 and 3, the transmission light source unit 2 includes the first light source portions 201, a first frame 23, and a first cover member 24. The first light source portions 201 further include first light sources 22 that emit point light and a first light guide 4 that shapes light emitted by the first light sources 22 into a line (shapes the light into a line light source). The first source portions 201 emit linear light that is long in the main-scan direction toward the conveyance path P of the paper sheet S, i.e. toward the image sensor unit 3.

The first light sources 22 of the first light source portions 201 can be, for example, light sources including light emitting elements that emit light in wavelength regions of red (R), green (G), blue (B), infrared (Ir), and ultraviolet (UV). Specifically, the first light sources 22 can be multi-color LEDs or the like including packaged LEDs of the wavelength regions. A specific configuration of the first light sources 22 is not particularly limited, and the configuration is appropriately set according to specifications and the like of the image reading apparatus 1. For example, a band of an emission wavelength of the first light sources is not particularly limited. The first light sources may include all or only part of the light emitting elements that emit the light of the wavelength regions. Although the transmission light source unit 2 includes two first light sources 22 in FIG. 2, the transmission light source unit 2 may include only one first light source 22.

The first light guide 4 is an optical member that shapes the light emitted by the first light sources 22 into a line (shapes the light into a line light source). The first light guide 4 has a rod-like shape that is long in the main-scan direction and is integrally formed by a transparent material, such as an acrylic resin material. One or both end surfaces of the first light guide 4 in a longitudinal direction (main-scan direction) are provided with first light incident surfaces 41 for receiving the light emitted by the first light sources 22. Side surfaces of the first light guide 4 are provided with a first light diffusing surface 42 for diffusing entered light and a first light emission surface 43 for emitting diffused light toward the outside (i.e. the conveyance path P of the paper sheet S). Details of the configuration of the first light guide 4 will be described later.

The first frame 23 is an example of a housing of the transmission light source unit 2. The first frame 23 has a shape of a rectangular solid that is long in the main-scan direction, and the first frame 23 is integrally formed by a light-blocking material. For example, the first frame 23 is integrally formed by polycarbonate colored in black (containing a black paint).

The first frame 23 includes a first light guide housing chamber 231 and first light source housing chambers 232 in a number corresponding to the number of first light sources 22. The first light guide housing chamber 231 is an area that houses the first light guide 4. The first light guide housing chamber 231 is long in the main-scan direction and has a groove-like shape in which the lower side opens. The first light source housing chambers 232 are areas that house the first light sources 22. The first light source housing chambers 232 are provided outside of the first light guide housing chamber 231 in the main-scan direction (longitudinal direction) and are connected to the first light guide housing chamber 231. If the first light incident surfaces 41 are provided on both end surfaces of the first light guide 4 in the longitudinal direction, the first light source housing chambers 232 are provided outside of both ends of the first light guide housing chamber 231 in the main-scan direction. If the first light incident surface 41 is provided on only one of the ends of the first light guide 4 in the longitudinal direction, the first light source housing chamber 232 is provided outside of only one (side where the first light incident surface 41 is positioned) of the ends of the first light guide housing chamber 231 in the main-scan direction.

The first cover member 24 is a plate-like member attached to the lower side of the first frame 23 (closer to the conveyance path P). The first cover member 24 has a function of protecting each member housed in the first frame 23, a function of preventing foreign matters such as dust from entering inside of the first frame 23, a function of maintaining the paper sheet S in a planar shape, and the like. The first cover member 24 is entirely transparent or has a transparent section. The first cover member 24 is formed by a transparent resin material, such as an acrylic resin.

<First Light Guide>

Figure 4A:
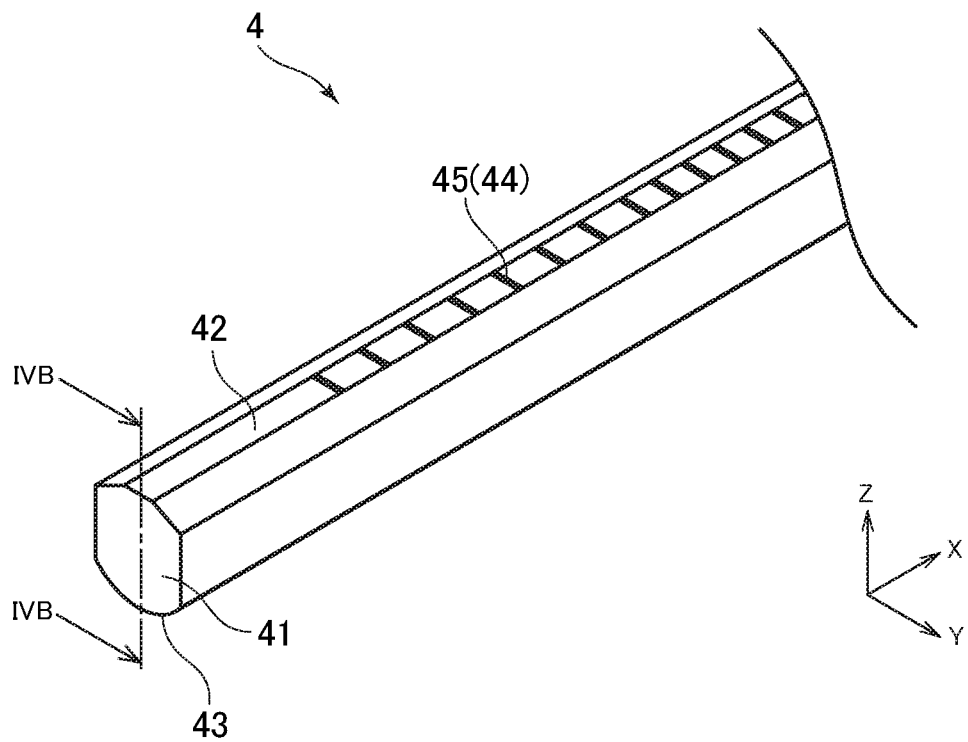
FIG. 4A is an external perspective view illustrating a configuration example of a first light guide.
Figure 4B:
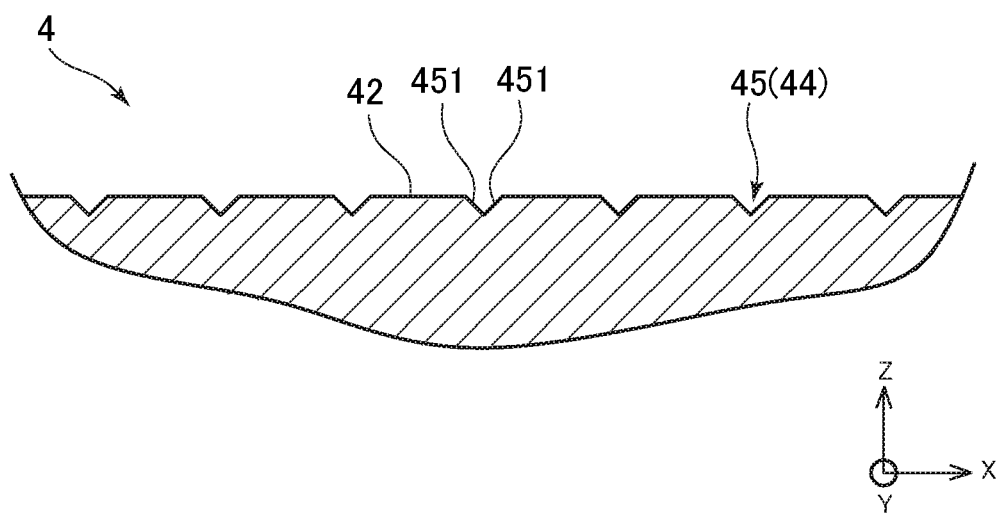
FIG. 4B is a sectional view of a line IVB-IVB of FIG. 4A.
Figure 5A:
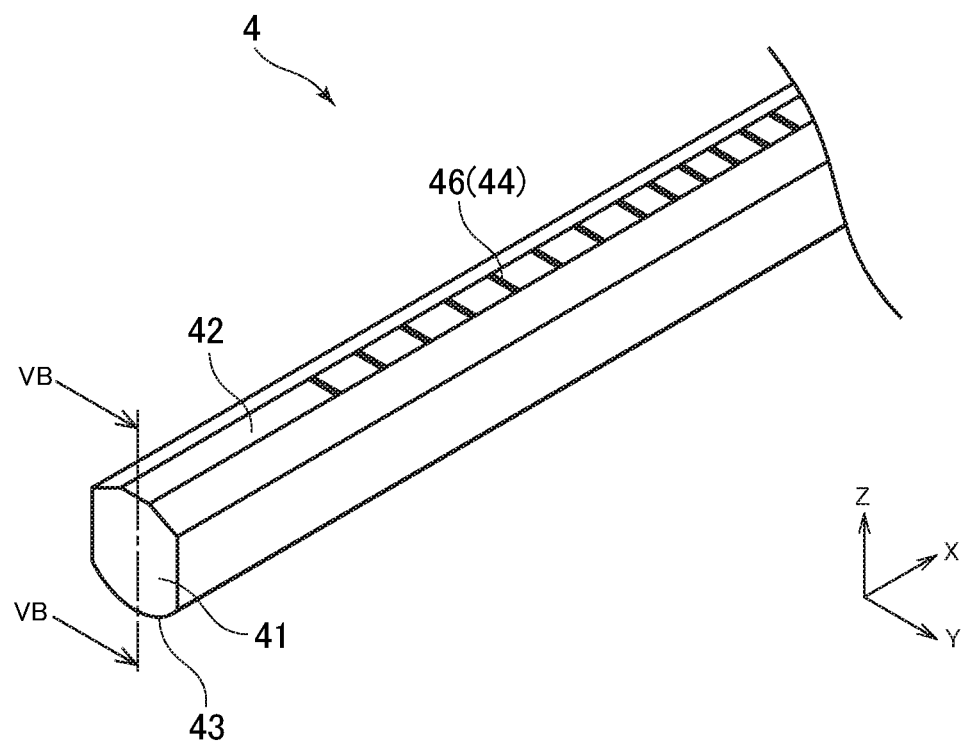
FIG. 5A is an external perspective view illustrating a configuration example of the first light guide.
Figure 5B:
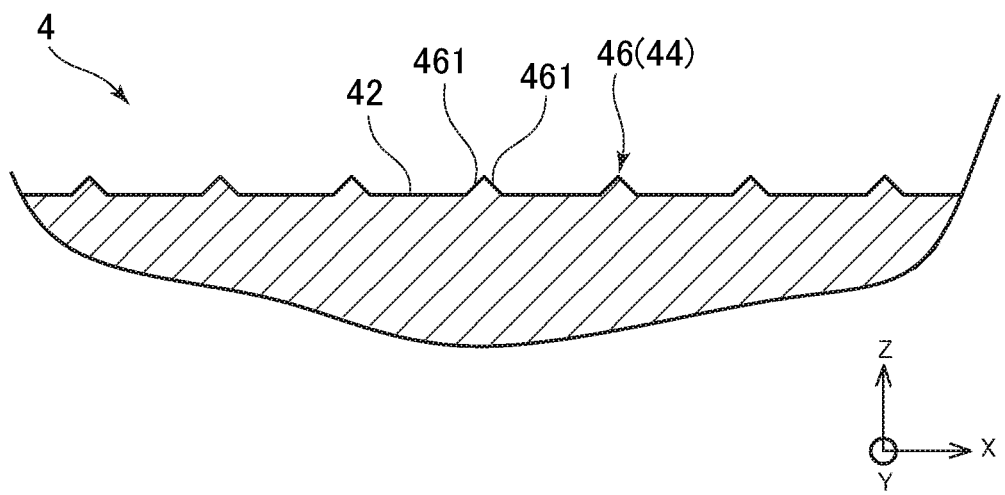
FIG. 5B is a sectional view of a line VB-VB of FIG. 5A.

Here, a configuration example of the first light guide 4 will be described with reference to FIGS. 4A to 5B. FIGS. 4A and 5A are external perspective views illustrating configuration examples of the first light guide 4 and are enlarged views illustrating the proximity of the end in the longitudinal direction. FIG. 4B is a sectional view of a line IVB-IVB of FIG. 4A, and FIG. 5B is a sectional view of a line VB-VB of FIG. 5A. FIGS. 4B and 5B are views illustrating cross sections of the first light guide 4 taken along flat surfaces perpendicular to the sub-scan direction.

The first light guide 4 has a rod-like shape that is long in the main-scan direction (see FIG. 2). The first light incident surfaces 41 are provided on both or one of the end surfaces of the first light guide 4 in the longitudinal direction. The first light incident surface 41 may be provided on a section of the end surface in the longitudinal direction, or the entire end surface may be the first light incident surface 41. As illustrated in FIGS. 4A and 5A, the first light emission surface 43 for emitting light toward a reading line O of the conveyance path P is provided on the lower side (side facing the conveyance path P) of the side surface of the first light guide 4. To allow emitting linear light toward the reading line O, the first light emission surface 43 has an arc-shaped cross section that is long in the main-scan direction and convex toward the lower side as viewed in the main-scan direction. The length of the first light emission surface 43 in the main-scan direction is set according to the width (dimension in the main-scan direction) of the paper sheet S handled by the image reading apparatus 1. For example, when the image reading apparatus 1 reads the paper sheet S of size A3, the dimension of the first light emission surface 43 in the longitudinal direction is set to a dimension according to the width of the paper sheet S of the size A3.

The first light diffusing surface 42 is provided on the upper side of the side surface of the first light guide 4, i.e. opposite side of the first light emission surface 43. The first light diffusing surface 42 has a function of forming a uniform main-scan direction distribution of the intensity of the light emitted from the first light emission surface 43. The first light diffusing surface 42 is a surface formed in a band-like shape that is long in the main-scan direction. In the present embodiment, the first light diffusing surface 42 is a flat surface parallel to the main-scan direction and the sub-scan direction. However, the first light diffusing surface 42 may be a curved surface. The first light diffusing surface 42 is provided with a plurality of concave portions 45 as an example of a plurality of light reflection portions 44 as illustrated in FIGS. 4A and 4B or is provided with a plurality of convex portions 46 as an example of the plurality of light reflection portions 44 as illustrated in FIGS. 5A and 5B. The concave portions 45 and the convex portions 46 as examples of the light reflection portions 44 have a function of reflecting light traveling inside of the first light guide 4. FIGS. 4A and 4B illustrate a configuration in which only the concave portions 45 are provided as the light reflection portions 44 on the first light diffusing surface 42, and FIGS. 5A and 5B illustrate a configuration in which only the convex portions 46 are provided as the light reflection portions 44 on the first light diffusing surface 42. However, the configurations are not limited to these. It is only necessary that the plurality of light reflection portions 44 are provided on the first light diffusing surface 42 and that the plurality of light reflection portions 44 include at least one of the concave portions 45 and the convex portions 46. Therefore, both of the concave portions 45 and the convex portions 46 may be provided as the plurality of light reflection portions 44 on the first light diffusing surface 42 (both of the concave portions 45 and the convex portions 46 may exist).

As illustrated in FIGS. 4A and 4B, grooves with a substantially "V"-shaped cross section are applied as the concave portions 45. As illustrated in FIGS. 5A and 5B, protrusion-like structures with a substantially triangular cross section are applied as the convex portions 46. The concave portions 45 and the convex portions 46 extend in a direction orthogonal to the longitudinal direction (main-scan direction) of the first light guide 4 or extend in a direction inclined relative to the longitudinal direction. Although FIGS. 4A and 5A illustrate an example in which the concave portions 45 and the convex portions 46 extend in a direction orthogonal to the longitudinal direction of the first light guide 4, the concave portions 45 and the convex portions 46 may extend in a direction inclined relative to the longitudinal direction of the first light guide 4. It is only necessary that the concave portions 45 and the convex portions 46 extend in a direction not parallel to the longitudinal direction of the first light guide 4. Although specific dimensions of the concave portions 45 and the convex portions 46 are not limited, the width can be 2 mm, and the depth or the height can be 1 mm, for example.

As illustrated in FIG. 4B, the concave portions 45 include a plurality of inclined surfaces 451 (two inclined surfaces 451 in the present embodiment) inclined relative to the vertical direction (i.e. normal direction of the first light emission surface 43 as viewed in the sub-scan direction) and the longitudinal direction (main-scan direction) of the first light guide 4 as viewed in the sub-scan direction. As illustrated in FIG. 5B, the convex portions 46 also include a plurality of inclined surfaces 461 (two inclined surfaces 461 in the present embodiment) inclined relative to the vertical direction and the longitudinal direction of the first light guide 4 as viewed in the sub-scan direction. According to the configuration, the light entering from the first light incident surfaces 41 and traveling inside of the first light guide 4 can be reflected toward the first light emission surface 43. Therefore, the light entering from the first light incident surfaces 41 and reflected by the light reflection portions 44 (the inclined surfaces 451 and 461 of the concave portions 45 and the convex portions 46) is emitted toward the lower side from the first light emission surface 43.

In this way, it is only necessary that the concave portions 45 and the convex portions 46 as examples of the light reflection portions 44 include the inclined surfaces 451 and 461 inclined relative to the vertical direction and the longitudinal direction of the first light guide 4, respectively. The inclined surfaces 451 and 461 are not limited to flat surfaces, but may be curved surfaces. For example, the concave portions 45 and the convex portions 46 may have a substantially arc-shaped cross section. According to the configuration, the light entering from the first light incident surfaces 41 and traveling inside of the first light guide 4 can be reflected toward the first light emission surface 43.

Figure 6A:
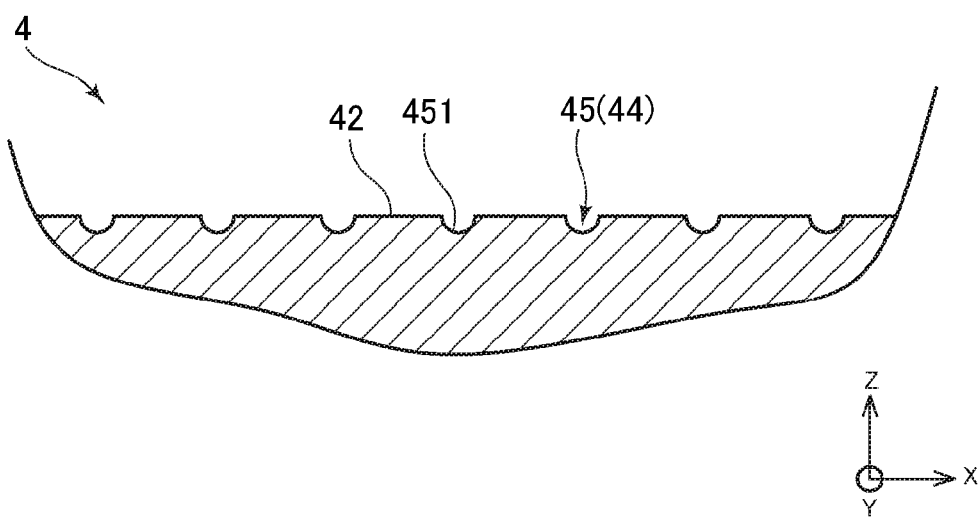
FIG. 6A is a sectional view schematically illustrating a modified example of convex portions.
Figure 6B:
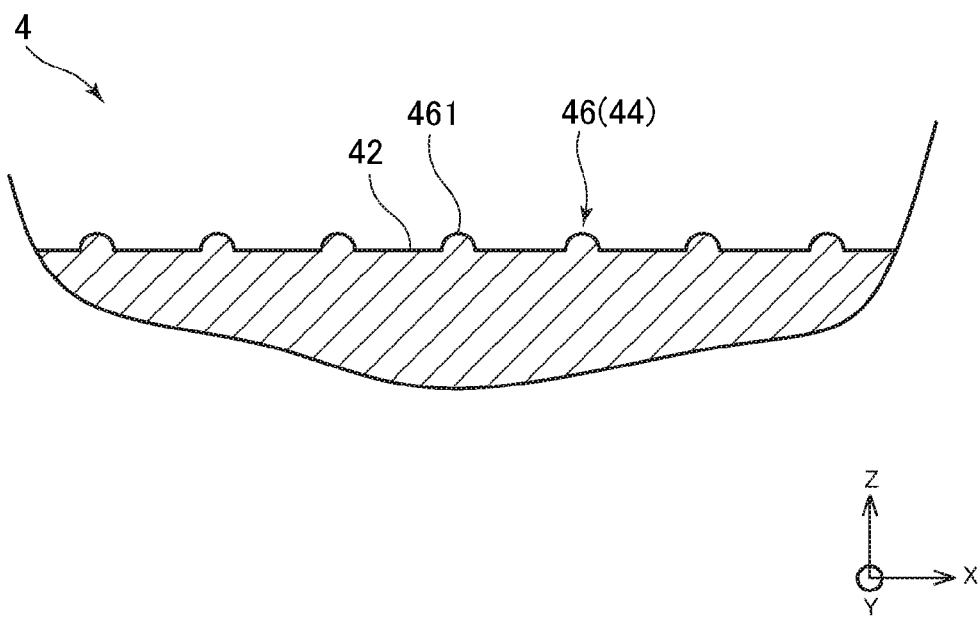
FIG. 6B is a sectional view schematically illustrating a modified example of concave portions.

The concave portions 45 as the light reflection portions 44 are not limited to the "V"-shaped grooves as illustrated in FIG. 4B. Similarly, the convex portions 46 as the light reflection portions 44 are not limited to the protrusion-like structures with the substantially triangular cross section. FIG. 6A is a sectional view schematically illustrating a modified example of the concave portions 45 and is a view corresponding to FIG. 4B. FIG. 6B is a sectional view schematically illustrating a modified example of the convex portions 46 and is a view corresponding to FIG. 5B. As illustrated in FIG. 6A, the concave portions 45 may be grooves with a substantially arc-shaped cross section (for example, semicircular shape). As illustrated in FIG. 6B, the convex portions 46 may be protrusion-like structures in a substantially arc-shaped cross section. The concave portions 45 and the convex portions 46 may have shapes other than the substantially arc-shaped cross section. In short, it is only necessary that the light reflection portions 44 (the concave portions 45 and the convex portions 46) include the inclined surfaces 451 and 461 inclined relative to the vertical direction and the main-scan direction as viewed in the sub-scan direction. The inclined surfaces 451 and 461 may be curved surfaces instead of the flat surfaces. Such a configuration can also attain the effect described above.

Here, an example of intervals between the light reflection portions 44 will be described with reference to FIGS. 7A and 7B. FIGS. 7A and 7B are views schematically illustrating intervals between the plurality of light reflection portions 44. FIG. 7A illustrates a case in which the first light incident surfaces 41 are provided on both end surfaces in the longitudinal direction, and FIG. 7B illustrates a case in which the first light incident surface 41 is provided on one of the end surfaces in the longitudinal direction.

As illustrated in FIG. 7A, the intervals between the light reflection portions 44 (the concave portions 45 and the convex portions 46) are the largest at end sections (section A and section C in FIG. 7A) in the longitudinal direction and the smallest at a center section (section B in FIG. 7A) in the longitudinal direction in the configuration in which the first light incident surfaces 41 are provided on both end surfaces in the longitudinal direction. The configuration can suppress non-uniformity of the main-scan direction distribution of the intensity of the light emitted from the first light emission surface 43. More specifically, when the light enters from each of the two first light incident surfaces 41 provided on both end surfaces in the longitudinal direction, the intensity of the light entering from the first light incident surfaces 41 and traveling inside of the first light guide 4 is the strongest at both end sections in the longitudinal direction and the weakest at the center section. Therefore, if the first light diffusing surface 42 is not provided with the light reflection portions 44 or if the intervals between the light reflection portions 44 are not uniform for example, the intensity of the light emitted from the first light emission surface 43 is the strongest at both end sections in the longitudinal direction and the weakest at the center section.

Therefore, as in the present embodiment, the intervals between the light reflection portions 44 are reduced at the center section in the longitudinal direction and enlarged at both end sections in the longitudinal direction compared to the center section. The intervals between the light reflection portions 44 can be continuously or gradually reduced from the end sections in the longitudinal direction toward the center section. According to the configuration, the amount of light reflected toward the first light emission surface 43 at the center section in the longitudinal direction can be greater than the amount of light at both end sections in the longitudinal direction. This can suppress the non-uniformity of the main-scan direction distribution of the intensity of the light emitted from the first light emission surface 43. In this way, it is only necessary that the intervals between the light reflection portions 44 decrease with an increase in the distance from the first light incident surfaces 41 of the first light guide 4.

As illustrated in FIG. 7B, the intervals between the light reflection portions 44 are the largest at an end section (section D in FIG. 7B) on the side provided with the first light incident surface 41 and the smallest at an end section (section F in FIG. 7B) on the opposite side in the configuration in which the first light incident surface 41 is provided on one of the end surfaces in the longitudinal direction. The intervals between the light reflection portions 44 at a center section (section E in FIG. 7B) in the longitudinal direction are smaller than the intervals at the end section (section D in FIG. 7B) on the side provided with the first light incident surface 41 and larger than the intervals at the end section (section F in FIG. 7B) on the opposite side. In this way, it is only necessary that the intervals between the light reflection portions 44 decrease with an increase in the distance from the first light incident surface 41 of the first light guide 4. The configuration can suppress the non-uniformity of the main-scan direction distribution of the intensity of the light emitted from the first light emission surface 43 for the same reason.

Furthermore, re-illumination light can be suppressed when the concave portions 45 and the convex portions 46 as examples of the light reflection portions 44 include the inclined surfaces 451 and 461. Details will be described later. Light is emitted from the second light source portions 301 and enters the first light guide 4 of the first light source portion 201, and the light is reflected by inside of the first light guide 4 and each portion of the transmission light source unit 2 and emitted from the first light guide 4 toward the image sensor unit 3. The light is the re-illumination light.

<Assembly Configuration of Transmission Light Source Unit>

Here, an assembly configuration of the transmission light source unit 2 will be described. The first light guide 4 is housed in the first light guide housing chamber 231 of the first frame 23, with the first light emission surface 43 facing the lower side. According to the configuration, the first light diffusing surface 42 of the first light guide 4 faces the inner surface of the first light guide housing chamber 231. As described, the first frame 23 is formed by a resin material colored in black. Therefore, the entire inner surface of the first light guide housing chamber 231 is black. Thus, the first light diffusing surface 42 of the first light guide 4 faces a black surface. Not the entire first frame 23 has to be black. To suppress the re-illumination light, it is only necessary that at least the surface facing the first light diffusing surface 42 of the first light guide 4 in the inner surface of the first light guide housing chamber 231 is black.

The first light sources 22 are housed in the first light source housing chambers 232. As described, the first light source housing chambers 232 and the first light guide housing chamber 231 are connected. Therefore, the light emitted by the first light sources 22 housed in the first light source housing chambers 232 enters the first light incident surfaces 41 of the first light guide 4 housed in the first light guide housing chamber 231. The first cover member 24 is attached to the lower side of the first frame 23. The light emitted from the first light emission surface 43 of the first light guide 4 transmits through the first cover member 24 and is emitted toward the lower side of the transmission light source unit 2.

<Image Sensor Unit>

Figure 9:
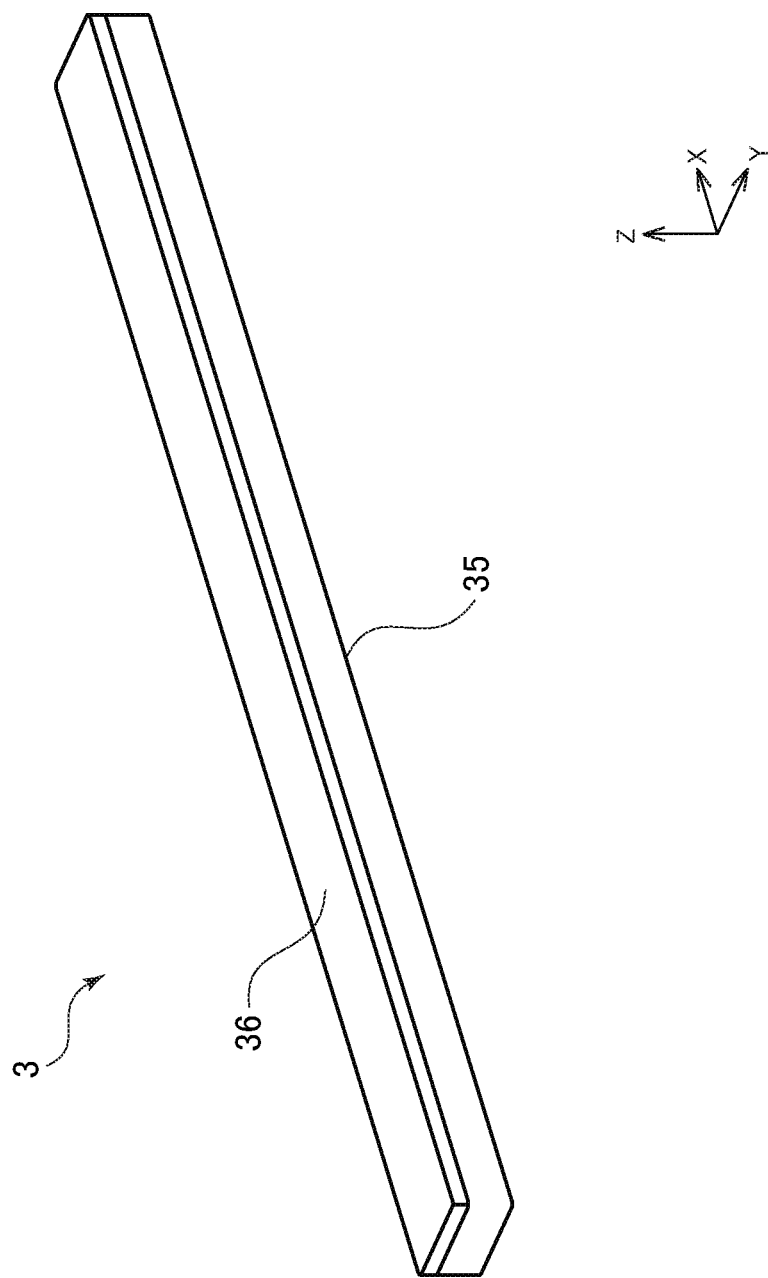
FIG. 9 is an external perspective view schematically illustrating a configuration example of the image sensor unit.

Next, a configuration example of the image sensor unit 3 will be described with reference to FIGS. 8 and 9. FIG. 8 is an exploded perspective view schematically illustrating a configuration example of the image sensor unit 3. FIG. 9 is an external perspective view schematically illustrating a configuration example of the image sensor unit 3. The image sensor unit 3 emits light from the lower side toward the paper sheet S conveyed through the conveyance path P. The image sensor unit 3 detects reflected light reflected by the paper sheet S after the emission by the image sensor unit 3 and transmitted light transmitted through the paper sheet S after the emission by the transmission light source unit 2 and obtains images of the reflected light and the transmitted light of the paper sheet S.

As illustrated in FIG. 8, the image sensor unit 3 includes two sets of the second light source portions 301, a light condenser 33, a circuit board 34, a second frame 35 as an example of a housing, and a second cover member 36. Each of the two sets of the second light source portions 301 includes a second light source 31 and a second light guide 32 that shapes the light emitted by the second light source 31 into a line (shapes the light into a line light source).

The configuration of the second light sources 31 is the same as the configuration of the first light sources 22. Therefore, the description will not be repeated. The second light guides 32 are optical members that shape the light emitted by the second light sources 31 into a line (shape the light into a line light source). The second light guides 32 have a rod-like shape that is long in the main-scan direction and are integrally formed by a transparent material, such as an acrylic resin material. End surfaces of the second light guides 32 in the longitudinal direction (main-scan direction) are provided with second light incident surfaces 321 that receive the light emitted by the second light sources 31. The second light incident surface 321 may be provided on a section of the end surface in the longitudinal direction, or the entire end surface in the longitudinal direction may function as the second light incident surface 321. The second light incident surfaces 321 may be provided on both end surfaces of the second light guides 32 in the longitudinal direction, or the second light incident surface 321 may be provided only on one of the end surfaces.

Second light emission surfaces 322 are provided on sides of side surfaces of the second light guides 32 facing the conveyance path P. The second light emission surfaces 322 are surfaces for emitting linear light toward the reading line O of the conveyance path P. The second light emission surfaces 322 have a band-like shape that is long and thin in the main-scan direction. The length of the second light emission surfaces 322 in the main-scan direction is set according to the width of the paper sheet S (dimension in the main-scan direction) handled by the image reading apparatus 1, like the first light emission surface 43 of the first light guide 4. The second light emission surfaces 322 are formed by curved surfaces convex toward the reading line O of the paper sheet S as viewed in the main-scan direction so as to emit the light toward the reading line O (see FIG. 1) of the paper sheet S.

Second light diffusing surfaces 323 for diffusing the light entered from the second light incident surfaces 321 are provided on the opposite sides of the second light emission surfaces 322 of the side surfaces of the second light guides 32 (see FIG. 1). The second light diffusing surfaces 323 have a band-like shape that is long and thin in the main-scan direction, like the second light emission surfaces 322. The second light diffusing surfaces 323 are provided with a diffusing pattern for diffusing the light entered from the second light incident surfaces 321. An example of the diffusing pattern includes a paint that produces diffuse reflection of the light, such as a dot pattern printed by white ink.

The light condenser 33 is an optical member that focuses the transmitted light and the reflected light from the paper sheet S on the surface of the image sensor 341. The light condenser 33 is, for example, a rod-lens array including a plurality of imaging elements (rod lenses) of an erecting equal magnification imaging type linearly arranged in the main-scan direction. It is only necessary that the imaging elements are linearly arranged in the longitudinal direction in the light condenser 33. For example, the imaging elements may be arranged in a plurality of lines in the light condenser 33. Conventionally well-known optical members with various light condensing functions, such as various micro-lens arrays, can be applied as the light condenser 33.

The circuit board 34 has a rectangular shape that is long in the main-scan direction. The image sensor 341 is provided on the upper surface of the circuit board 34, and the second light sources 31 are mounted on the upper surface of the circuit board 34. A connector 342 for electrical connection to the outside (for example, a control circuit that functions as the control portion 12 or an arithmetic circuit that functions as the image distinguishing portion 13) is mounted on the lower surface of the circuit board 34.

The image sensor 341 converts the light focused by the light condenser 33 into an electric signal (image signal) and outputs the signal. The image sensor 341 is mounted so that a light receiving surface (surface on which light receiving elements detect light) faces upward to allow the light from the light condenser 33 to be received. The image sensor 341 is, for example, an image sensor IC array. The image sensor IC array includes a plurality of image sensor ICs linearly mounted on the upper surface of the circuit board 34 in the main-scan direction. The image sensor ICs include a plurality of light receiving elements (may also be called photoelectric conversion elements) according to the resolution of reading by the image sensor unit 3. In this way, the image sensor 341 includes a plurality of image sensor ICs (light receiving elements) linearly arranged in the main-scan direction. It is only necessary that a plurality of image sensor ICs are linearly arranged in the image sensor 341, and other configurations are not particularly limited. For example, the image sensor ICs may be arranged in a plurality of lines like a staggered arrangement. The image sensor ICs included in the image sensor 341 can be various conventionally well-known image sensor ICs.

The second frame 35 is an example of a housing of the image sensor unit 3. The second frame 35 has, for example, a shape of a rectangular solid that is long in the main-scan direction and is integrally formed by a light-blocking resin material, like the first frame 23.

The second frame 35 includes two second light guide housing chambers 351, second light source housing chambers 352 in a number corresponding to the number of the second light sources 31, a light condenser housing chamber 353, and a circuit board housing chamber 354 (see FIG. 1). The two second light guide housing chambers 351 are areas for housing the two second light guides 32, and both of the second light guide housing chambers 351 are groove-like areas that are long in the main-scan direction and in which the upper side opens. The light condenser housing chamber 353 is an area for housing the light condenser 33 and is an area like a slit hole that is long in the main-scan direction and penetrating in the vertical direction. The circuit board housing chamber 354 is an area for housing the circuit board 34 and is an area in which the lower side opens. The two second light guide housing chambers 351 are provided parallel to each other, at a predetermined distance in the sub-scan direction. The light condenser housing chamber 353 is provided between the two second light guide housing chambers 351. Longitudinal directions of the two second light guide housing chambers 351 and the light condenser housing chamber 353 are parallel to the main-scan direction.

The plurality of second light source housing chambers 352 are areas for housing the second light sources 31. The second light source housing chambers 352 are provided outside of the second light guide housing chambers 351 in the main-scan direction (longitudinal direction) and connected to the second light guide housing chambers 351. The second light source housing chambers 352 are provided on both sides of the second light guide housing chambers 351 in the longitudinal direction if the second light incident surfaces 321 are provided on both end sections of the second light guides 32 in the longitudinal direction. The second light source housing chamber 352 is provided on one of the end sections of the second light guide housing chamber 351 in the longitudinal direction, on the side where the second light incident surface 321 is positioned, if the second light incident surface 321 is provided on one of the end sections of the second light guides 32 in the longitudinal direction. The circuit board housing chamber 354 is provided at a lower part of the second frame 35, particularly below the light condenser housing chamber 353. An opening like a slit hole that is long in the main scan direction links the circuit board housing chamber 354 and the light condenser housing chamber 353, in a manner that the light can pass through.

In addition, an attachment portion and the like not shown for attachment to the image reading apparatus 1 are provided on the second frame 35. The configuration of the attachment portion is not particularly limited. It is only necessary that the attachment portion can attach the second frame 35 to the image reading apparatus 1.

The second cover member 36 is a plate-like member attached to an upper side of the second frame 35 (closer to the conveyance path P). The second cover member 36 is entirely transparent or has a transparent section. The second cover member 36 is formed by a transparent resin material, such as an acrylic resin. The second cover member 36 has a function of protecting each member housed in the second frame 35, a function of preventing foreign matters such as dust from entering inside of the second frame 35, a function of maintaining the paper sheet S in a planar shape, and the like.

<Assembly Configuration of Image Sensor Unit>

Here, an assembly configuration of the image sensor unit 3 will be described with reference to FIG. 1. The light condenser 33 is housed in the light condenser housing chamber 353 of the second frame 35 and is bonded and fixed to the second frame 35. An adhesive for boding the light condenser 33 can be, for example, various well-known ultraviolet-curable adhesives. As illustrated in FIG. 1, an optical axis L of the light condenser 33 housed in the light condenser housing chamber 353 as viewed in the main-scan direction is parallel to the vertical direction and orthogonal to the conveyance path P (conveyance direction of the paper sheet S). An intersection of the conveyance path P and the optical axis L of the light condenser 33 as viewed in the main-scan direction (straight line extending in the main-scan direction) is the reading line O that is a position where the image sensor unit 3 reads the paper sheet S.

The second light guide 32 is housed in each of the two second light guide housing chambers 351 of the second frame 35. Pressing pieces 355 elastically deformable in the sub-scan direction are provided on the second frame 35. The pressing pieces 355 urge and bring the second light guides 32 housed in the second light guide housing chambers 351 into contact with the inner surface on the side closer to the light condenser housing chamber 353. This maintains the second light guides 32 in a state positioned on the second frame 35. In the second light guides 32, optical axes M emitted from the second light emission surfaces 322 are inclined at a predetermined angle relative to the optical axis L of the light condenser 33 so that light can be emitted toward the reading line O of the conveyance path P.

The second light sources 31 are housed in the second light source housing chambers 352. The second light source housing chambers 352 are provided outside of the second light guide housing chambers 351 in the longitudinal direction and connected to the second light guide housing chambers 351. According to the configuration, the second light sources 31 face the second light incident surfaces 321 of the second light guides 32 housed in the second light guide housing chambers 351 when the second light sources 31 are housed in the second light source housing chambers 352. Therefore, the light emitted by the second light sources 31 is emitted to the second light incident surfaces 321 of the second light guides 32, and the light enters inside of the second light guides 32 from the second light incident surfaces 321.

The circuit board 34 is housed in the circuit board housing chamber 354 from the lower side of the second frame 35 and fixed to the second frame 35. In a state that the circuit board 34 is housed in the circuit board housing chamber 354, a light receiving surface of the image sensor 341 is positioned on the optical axis L of the light condenser 33, at a focal point on the lower side of the light condenser 33. As a result, the light from the reading line O passes through the light condenser 33 and is focused on the light receiving surface of the image sensor 341. The second light sources 31 housed in the second light source housing chambers 352 are connected to the circuit board 34. As a result, power for operation is supplied through the circuit board 34, and the second light sources 31 emit light.

<Operation of Image Reading Apparatus>

Next, an operation of the image reading apparatus 1 will be described. As illustrated in FIG. 1, the transmission light source unit 2 and the image sensor unit 3 are arranged to face each other across the conveyance path P of the paper sheet S in the image reading apparatus 1. An optical axis N emitted by the first light source portions 201 of the transmission light source unit 2 coincides with the optical axis L of the light condenser 33 of the image sensor unit 3 as viewed in the main-scan direction. The image reading apparatus 1 can perform both of reflection reading and transmission reading of the paper sheet S through the image sensor unit 3 and the transmission light source unit 2 arranged to face each other. In an example illustrated here, the image reading apparatus 1 is a paper sheet distinguishing apparatus with a function of distinguishing the paper sheet S, and the paper sheet S to be read (to be distinguished) is a bill.

The control portion 12 of the image reading apparatus 1 controls a drive mechanism not shown to rotate the conveyor rollers 11, and the conveyor rollers 11 convey the bill (paper sheet S) in the sub-scan direction. Therefore, the bill is conveyed in the sub-scan direction to move the bill and the transmission light source unit 2 as well as the image sensor unit 3 relative to each other in the sub-scan direction in the present embodiment. The image reading apparatus 1 performs transmission reading and reflection reading of the bill (paper sheet S) through the transmission light source unit 2 and the image sensor unit 3 while conveying the bill in the sub-scan direction.

When the control portion 12 of the image reading apparatus 1 reads the bill, the control portion 12 sequentially turns on light emitting elements of each color of the first light sources 22 of the transmission light source unit 2 and the second light sources 31 of the image sensor unit 3. The light emitted by the first light sources 22 enters inside from the first light incident surfaces 41 of the first light guide 4 and travels inside. The light is reflected by the light reflection portions 44 of the first light diffusing surface 42 and emitted from the first light emission surface 43 toward the reading line O. The first light emission surface 43 is long in the main-scan direction, and the first light guide 4 shapes the light emitted by the first light sources 22 into a line (shapes the light into a line light source). When the bill is on the reading line O, the light emitted from the first light guide 4 transmits through the bill and enters the light condenser 33 of the image sensor unit 3. The light condenser 33 focuses the light on the light receiving surface of the image sensor 341. The image sensor 341 converts the light focused by the light condenser 33 into an electric signal (image signal) and outputs the signal. The image reading apparatus 1 performs transmission reading of the bill in this way.

The light emitted by the second light sources 31 of the image sensor unit 3 enters inside from the second light incident surfaces 321 of the second light guides 32 and travels inside. The light is reflected by the second light diffusing surfaces 323 and emitted from the second light emission surfaces 322 toward the reading line O. When the bill is on the reading line O, the light emitted from the second light guides 32 is reflected by the bill and enters the light condenser 33 of the image sensor unit 3. The light condenser 33 focuses the light on the light receiving surface of the image sensor 341. The image sensor 341 converts the light focused by the light condenser 33 into an electric signal (image signal) and outputs the signal. The image reading apparatus 1 performs reflection reading of the bill in this way.

The image reading apparatus 1 reads all of the transmitted light of each color emitted by the light emitting elements of each color of the first light sources 22 and the reflected light of each color emitted by the light emitting elements of each color of the second light sources 31 to complete the reading operation of one scan line. The image reading apparatus 1 rotates the conveyor rollers 11 to convey the bill and performs the transmission reading and the reflection reading throughout the entire bill. For example, the image reading apparatus 1 emits visible light to read a visible light image of a predetermined pattern provided on the bill and emits infrared light to read an infrared image of the bill.

The image distinguishing portion 13 then authenticates the bill. For example, a genuine bill image is obtained by emitting visible light and infrared light to a genuine bill prepared in advance, and the image distinguishing portion 13 compares the genuine bill image with the visible light image and the infrared image of the bill to be judged at the authentication. This is because the genuine bill includes a region in which the images obtained under visible light and under infrared light are different.

<Suppression of Re-Illumination Light>

Here, a mechanism of suppressing the re-illumination light will be described. As described, light is emitted from the second light source portions 301 and enters the first light guide 4 of the first light source portion 201, and the light is reflected by inside of the first light guide 4 and each portion of the transmission light source unit 2 and emitted from the first light guide 4 toward the image sensor unit 3. The light is the re-illumination light. In the reflection reading, it is preferable that the contrast between the paper sheet S and outside around the paper sheet S (i.e. background) is high. Particularly, to read the paper sheet S with a high brightness, it is preferable that the brightness outside around the paper sheet S is lower than the brightness of the paper sheet S, and it is more preferable that the brightness is in a black level. Therefore, the re-illumination light is suppressed to increase the contrast in the present embodiment.

When the transmission light source unit 2 and the image sensor unit 3 are arranged to face each other across the conveyance path P of the paper sheet S, the light emitted by the second light source portions 301 of the image sensor unit 3 enters the first light emission surface 43 of the first light guide 4 if the paper sheet S is not on the reading line O. When the width of the paper sheet S (dimension in the main-scan direction) is smaller than the length of the second light emission surfaces 322 of the second light guides 32, the light passed outside of the paper sheet S in the width direction enters the first light emission surface 43 of the first light guide 4.

When the light entered from the first light emission surface 43 is reflected by the first light diffusing surface 42 in the first light guide 4, the light is emitted toward the lower side from the first light emission surface 43. The light as the re-illumination light enters the light condenser 33 and is detected by the image sensor 341. Therefore, when the re-illumination light is generated, the brightness of the area outside around the paper sheet S increases in the image output by the image sensor 341. As a result, the contrast between the area inside and the area outside of the paper sheet S is reduced in the image output by the image sensor 341. Therefore, the quality of reading is reduced. For example, the accuracy of recognizing the outer edge (contour) of the paper sheet S may be reduced in distinguishing a bill as an example of the paper sheet S.

On the other hand, according to the configuration of the present embodiment, the light reaching the light reflection portions 44 (the concave portions 45 or the convex portions 46) of the first light diffusing surface 42 of the light entering the first light emission surface 43 is reflected by the inclined surfaces 451 and 461. The inclined surfaces 451 and 461 are inclined relative to the vertical direction (normal direction of the first light emission surface 43 as viewed in the sub-scan direction) as described above. Therefore, the light traveling in a direction parallel to the vertical direction or the light traveling in a direction almost parallel to the vertical direction is reflected by the inclined surfaces 451 and 461 in a direction different from the vertical direction. This prevents the light reflected by the inclined surfaces 451 and 461 from directly reaching the first light emission surface 43. Therefore, the re-illumination light can be suppressed.

The light reaching a section that is not the light reflection portions 44, i.e. a section of the flat surface of the first light diffusing surface 42, is emitted outside (upward) from the first light diffusing surface 42. The first light diffusing surface 42 faces the inner surface of the first light guide housing chamber 231. The inner surface of the first light guide housing chamber 231 is black, and this prevents the light emitted from the first light diffusing surface 42 from being reflected by the inner surface of the first light guide housing chamber 231 and entering inside from the first light diffusing surface 42 again. When the light entered from the first light diffusing surface 42 is emitted from the first light emission surface 43, the re-illumination light may enter the light condenser 33 of the image sensor unit 3. However, the reflection by the inner surface of the first light guide housing chamber 231 is suppressed, and the re-illumination light is suppressed.

In this way, according to the present embodiment, the re-illumination light can be suppressed to increase the contrast between the area of the paper sheet S in the image output by the image sensor 341 and the area outside around the area. Particularly, the re-illumination light can be suppressed, and the brightness outside around the paper sheet S can be lower than the brightness of the paper sheet S, and the brightness can be close to black. Therefore, the accuracy of reading (accuracy of recognizing the range of the paper sheet S) can be increased in reading the paper sheet S with a high brightness, for example. According to the present embodiment, a light blocking plate or the like does not have to be provided to suppress the re-illumination light. Therefore, the number of components is not increased, and the configuration is not complicated. According to the present embodiment, the non-uniformity of the main-scan direction distribution of the intensity of the light emitted from the first light guide 4 can be suppressed, and the image quality of the transmission reading can be improved.

The sections not described or not shown can have the same configurations as in a conventional image reading apparatus 1. The image distinguishing portion 13 may be provided on the circuit board 34. Although the visible light and the infrared light are emitted to read a visible light image and an infrared image of the bill in the present embodiment, the configuration is not limited to this. For example, ultraviolet light may be emitted. Although the bill is illustrated as an example of the paper sheet S, the type of the paper sheet S is not limited. For example, the paper sheet S can be various securities or ID cards.

EXAMPLES

Figure 10:
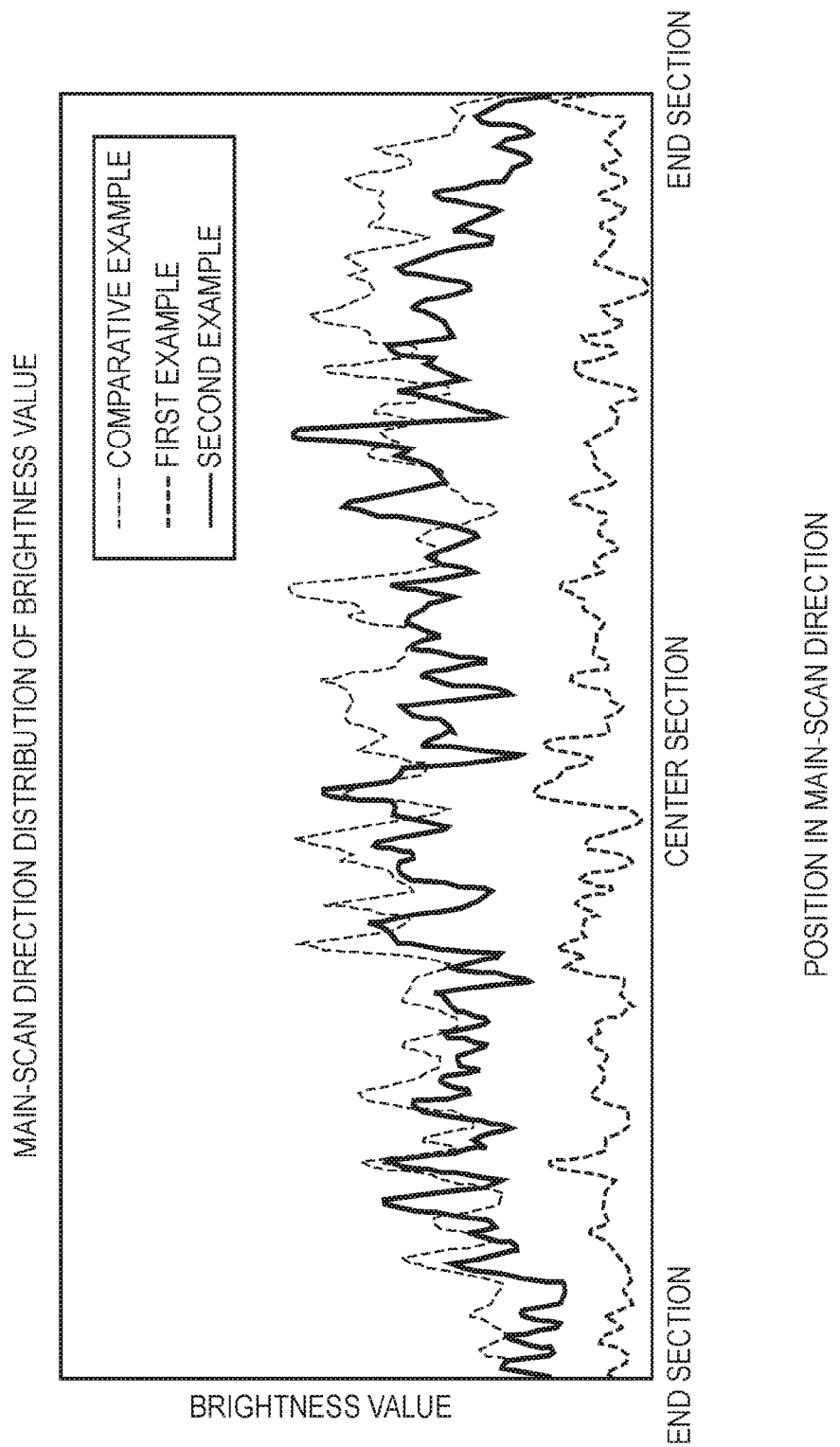
FIG. 10 is a graph illustrating simulation results of examples and a comparative example.

Next, examples of the present invention will be described. The present inventor has simulated and calculated the main-scan direction distribution of the intensity of light (brightness value) detected by the image sensor when the light is emitted by the second light sources 31. FIG. 10 is a graph illustrating simulation results of examples and a comparative example. The concave portions 45 are provided on the first light guide 4 in a first example of the present invention, and the convex portions 46 are provided in a second example. The concave portions 45 are grooves with a substantially "V"-shaped cross section, and the convex portions 46 are protrusion-like structures with substantially triangular cross section. Meanwhile, a dot pattern is printed by a white ink on the first light diffusing surface 42 in the comparative example.

The brightness value is high at the center section in the main-scan direction and low at the end sections in the result obtained in the comparative example. In this way, the main-scan direction distribution of the intensity of light is non-uniform in the result of the comparative example. On the other hand, the brightness value as a whole is lower than that of the comparative example, and the main-scan direction distribution of the intensity of light is uniform in the result obtained in the first example. The brightness value as a whole is lower than that of the comparative example in the result obtained in the second example. In this way, it is confirmed that the examples of the present invention can suppress (reduce) the re-illumination light compared to the configuration of the conventional example in which the dot pattern is printed by a white ink.

Although the embodiment and the examples of the present invention have been described in detail, the embodiment and the examples are just specific examples for carrying out the present invention. The technical scope of the present invention is not limited to the embodiment and the examples. Various changes can be made in the present invention without departing from the scope of the present invention.

For example, although the paper sheet distinguishing apparatus is illustrated as an example of the image reading apparatus in the embodiment, the image reading apparatus is not limited to the paper sheet distinguishing apparatus. The image reading apparatus can be various scanners or copy machines as long as the image reading apparatus can handle transmission reading. An image reading apparatus can be applied regardless of the type as long as the image reading apparatus has a function of image reading corresponding to transmission reading.

Although the image sensor unit includes two sets of second light source portions in the embodiment, the number of second light source portions included in the image sensor unit is not limited.

The present invention can be effectively utilized in an image reading apparatus including a transmission light source unit and an image sensor unit. Examples of the image reading apparatus include an image scanner, a facsimile, a copying machine, a compound machine, and a distinguishing apparatus of a bill. According to the present invention, the re-illumination light can be suppressed without increasing the number of components, and the read quality can be improved.

According to the present invention, the re-illumination light can be suppressed to increase the contrast of the image without increasing the number of components.

What is claimed is:

1. An image reading apparatus comprising a transmission light source unit and an image sensor unit arranged to face each other across a conveyance path of a paper sheet,
the transmission light source unit comprising a first light source portion comprising: a light source; and a light guide that emits light emitted by the light source toward the conveyance path of the paper sheet,
the image sensor unit comprising: a second light source portion that emits light toward the conveyance path of the paper sheet; and an image sensor that detects the light emitted by the first light source portion and transmitted through the paper sheet and the light emitted by the second light source portion and reflected by the paper sheet,
the light guide comprising: a light emission surface that emits light toward the conveyance path of the paper sheet; and a light diffusing surface that is provided on an opposite side of the light emission surface and that diffuses the light emitted by the light source, wherein
the light diffusing surface is provided with at least one of concave portions and convex portions including inclined surfaces inclined relative to a normal line of the light emission surface.

2. The image reading apparatus according to claim 1, wherein
the concave portions are grooves with a substantially "V"-shaped or substantially arc-shaped cross section extending in a direction orthogonal to or a direction inclined relative to a longitudinal direction of the light guide, and
the convex portions are protrusion-like structures with a substantially triangular or substantially arc-shaped cross section extending in a direction orthogonal to or a direction inclined relative to the longitudinal direction of the light guide.

3. The image reading apparatus according to claim 1, wherein
one of end surfaces of the light guide in the longitudinal direction is provided with a light incident surface that receives the light emitted by the light source, and
intervals between the concave portions or the convex portions decrease with an increase in a distance from the light incident surface.

4. The image reading apparatus according to claim 1, wherein
both end surfaces of the light guide in the longitudinal direction are provided with light incident surfaces that receive the light emitted by the light source, and
intervals between the concave portions or the convex portions decrease from both end surfaces in the longitudinal direction toward a center in the longitudinal direction.

5. The image reading apparatus according to claim 1, wherein
the transmission light source unit further comprises a frame that houses the light guide, and
a surface of the frame facing the light diffusing surface is black.

* * * * *